United States Patent
Draper (10) Patent No.: US 9,157,641 B1
(45) Date of Patent: Oct. 13, 2015

(54) OVEN DOOR SUPPORT LEGS

(76) Inventor: Richard J. Draper, Roseville, MI (US)

( * ) Notice: Subject to any disclaimer, the term of this patent is extended or adjusted under 35 U.S.C. 154(b) by 1269 days.

(21) Appl. No.: 13/033,315

(22) Filed: Feb. 23, 2011

Related U.S. Application Data (60) Provisional application No. 61/307,020, filed on Feb. 23, 2010.

(51) Int. Cl.
| | |
|---|---|
| *F24C 15/02* | (2006.01) |
| *A47B 3/08* | (2006.01) |
| *A47B 5/06* | (2006.01) |
| *F24B 1/192* | (2006.01) |
| *F24B 13/00* | (2006.01) |
| *A47B 5/00* | (2006.01) |
| *F16M 11/16* | (2006.01) |

(52) U.S. Cl.
CPC ............. *F24C 15/026* (2013.01); *A47B 3/08* (2013.01); *F24C 15/023* (2013.01); *A47B 5/00* (2013.01); *F16M 11/16* (2013.01); *F24B 13/004* (2013.01); *F24C 15/02* (2013.01); *F24C 15/028* (2013.01)

(58) Field of Classification Search
CPC ...... F24C 15/026; F24C 15/02; F24C 15/023; F24C 15/028; F24B 13/004; A47B 3/0803; A47B 3/08; A47B 5/06; A47B 5/04; A47B 2003/08; A47B 2097/008; A47B 96/07; F16M 11/16; F16M 11/18
USPC ............ 126/190, 194; 5/10.1, 16, 29; 211/85, 211/119.001, 144, 150, 165; 248/595, 598, 248/124.1, 240, 240.2, 240.4, 125.7, 371, 248/166, 188.5, 650
IPC ........ F24C 015/02, 015/026, 015/023, 015/028, F24C 015/08; A47B 005/06, 005/04, 005/00, A47B 003/08; F24B 001/20, 001/192
See application file for complete search history.

(56) References Cited

U.S. PATENT DOCUMENTS

| | | | | | |
|---|---|---|---|---|---|
| 110,747 | A | * | 1/1871 | Deane et al. ................. | 126/190 |
| 115,902 | A | * | 6/1871 | Smith ........................... | 126/190 |
| 251,657 | A | * | 12/1881 | Van ............................... | 126/190 |
| 344,521 | A | * | 6/1886 | Culver ......................... | 126/190 |
| 499,902 | A | * | 6/1893 | Wood ............................... | 5/42 |
| 1,166,131 | A | * | 12/1915 | Jeavons et al. ............ | 126/273 R |
| 1,239,540 | A | * | 9/1917 | Taylor ............................ | 5/10.1 |
| 2,326,461 | A | | 8/1943 | Howe | |
| 2,803,510 | A | * | 8/1957 | Carbary ................... | 312/351.13 |

(Continued)

FOREIGN PATENT DOCUMENTS

| | | | | | |
|---|---|---|---|---|---|
| DE | 4026391 | A1 | * | 2/1992 | ............... A47B 5/04 |
| EP | 632180 | A1 | * | 1/1995 | ............... E05F 1/12 |

(Continued)

*Primary Examiner* — Gregory Huson
*Assistant Examiner* — Daniel E Namay
(74) *Attorney, Agent, or Firm* — Robert C. Montgomery; Montgomery Patent & Design, LP.

(57) ABSTRACT

A pair of self-folding legs intended to support a door of an oven when in an open position pivot downwardly from a front surface of the door to a floor surface, thus forming a stable support system. In such a manner, heavy objects can be placed on the door surface as they enter and exit the oven cavity. The pair of legs is fastened to the front surface of the door using a high-temperature adhesive fastening method. The legs automatically pivot down as the door is opened and fold back up when the door is closed. Each leg comprises a height adjustable foot with a rubberized bottom surface to accommodate all styles and sizes of ovens to avoid damage to the floor surface.

10 Claims, 5 Drawing Sheets

(56) References Cited

U.S. PATENT DOCUMENTS

| | | | |
|---|---|---|---|
| 3,286,706 A | | 11/1966 | Hoppe |
| 3,354,878 A | * | 11/1967 | Balls .......................... 126/275 R |
| 3,626,925 A | | 12/1971 | Dalton |
| 4,092,973 A | * | 6/1978 | Bernazzani ................. 126/37 B |
| 4,848,312 A | * | 7/1989 | Roy ............................. 126/37 B |
| 5,188,139 A | | 2/1993 | Garelick |
| 5,322,250 A | | 6/1994 | Wilhite, Jr. |
| 5,546,927 A | | 8/1996 | Lancelot |
| 5,660,121 A | | 8/1997 | Botts et al. |
| 7,122,766 B1 | * | 10/2006 | Main ............................ 219/414 |
| 7,607,488 B2 | * | 10/2009 | Durham ......................... 169/46 |
| 2008/0223356 A1 | * | 9/2008 | Shenouda ................... 126/1 R |
| 2009/0151608 A1 | * | 6/2009 | Aldred et al. ................ 108/131 |
| 2009/0194007 A1 | * | 8/2009 | Pearson ....................... 108/116 |
| 2012/0085269 A1 | * | 4/2012 | Ohide ............................ 108/44 |

FOREIGN PATENT DOCUMENTS

| | | | | |
|---|---|---|---|---|
| JP | 2005095445 A | * | 4/2005 | ............... A47K 1/05 |
| JP | 2010099356 A | * | 5/2010 | |
| WO | WO 2008094336 A1 | * | 8/2008 | ............... A47B 5/06 |

* cited by examiner

OVEN DOOR SUPPORT LEGS

RELATED APPLICATIONS

The present invention was first described in and claims the benefit of U.S. Provisional Application No. 61/307,020 filed Feb. 23, 2010, the entire disclosures of which are incorporated herein by reference.

FIELD OF THE INVENTION

The present invention relates generally to oven doors, and in particular, to legs supporting an oven door.

BACKGROUND OF THE INVENTION

Residential ovens are one (1) of the most oft-utilized appliances in the preparation of meals on a day-to-day basis. These ovens, typically located within a kitchen in a home, are generally located along a ground surface and provide a large interior space capable of holding more food and reaching higher temperatures than most other residentially available cooking appliances such as toasters or microwaves.

Due to their size, most ovens have large doors which hinge down and out from the oven structure. These doors typically stop at a position parallel to the ground surface and several inches or feet above the ground. In many cases, the door is even with a lower cooking surface of the oven when in this open position. As such, it is a naturally tendency to slide large foodstuffs and cooking containers into and out of the oven by utilizing the door as an intermediate surface. However, this can be dangerous if the foodstuff or cooking container is particularly heavy. Objects such as heavy roasts or large baking dishes can inadvertently upset the balance of the oven and cause the entire oven to tip forward. If any items are on top of the stove at this time, injuries and serious burns can result.

A user can simply avoid placing heavy objects on the door at all. However, not using the door is unfavorable because the use of the door allows physically disadvantaged persons such as the elderly, disabled, or weak in stature to place and lift a heavy object in an easier and safer manner.

Various attempts have been made to provide oven door support devices. Examples of these attempts can be seen by reference to several U.S. patents including U.S. Pat. No. 2,326,461; U.S. Pat. No. 3,286,706; U.S. Pat. No. 3,626,925; U.S. Pat. No. 5,188,139; U.S. Pat. No. 5,322,250; U.S. Pat. No. 5,546,927; and U.S. Pat. No. 5,660,121. However, none of these designs are similar to the present invention.

While these devices fulfill their respective, particular objectives, each of these references suffer from one (1) or more of the aforementioned disadvantages. Many such devices do not provide a simple deployment mechanism. Also, many such devices do not provide sufficient and simple adjustment features. Furthermore, many such devices do not provide simple installation to an existing oven door. In addition, many such devices may damage an oven door or floor surface during installation and use. Moreover, many such devices severely impact the aesthetic qualities of an oven and a kitchen as a whole. Accordingly, there exists a need for oven door support legs without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a simple oven door support leg device providing necessary adjustment features while providing simple and efficient installation, operation, protection, and appearance. Thus, the object of the present invention is to solve the aforementioned disadvantages and provide for this need.

To achieve the above objectives, it is an object of the present invention to provide a pair of leg assemblies which support an oven door when the door is in an open, horizontal position.

Another object of the present invention is to automatically deploy the leg assemblies upon opening of the oven door. Each leg assembly is connected to a mounting bracket assembly with a freely pivoting hinge pin such that the leg assemblies automatically face downwardly as the door is opened due to gravity.

Yet still another object of the present invention is to offset the hinge pin with respect to the leg assembly such that the top of the leg assembly automatically limits motion to a ninety degree (90°) angle during deployment, increasing the precision of the automatic deployment and support provided by the device.

Yet still another object of the present invention is to provide a favorable aesthetic appearance to the device and the oven by discreetly concealing the leg assemblies within the mounting bracket assembly when the oven door is in a closed, upright position.

Yet still another object of the present invention is to readily attach to an existing oven with an adhesive or other fastener. The mounting bracket assemblies include a flat rear surface which provides a large area of contact between the device and the oven door.

Yet still another object of the present invention is to allow a user to adjust the device to accommodate oven doors of varying height by including an adjustable foot portion on each leg assembly. The leg assembly includes a threaded shaft portion which allows a user to selectively extend the food portion and a locking nut to secure the foot portion at the desired length.

Yet still another object of the present invention is to protect the floor surface in front of the oven from scratching or indentation by providing each foot portion with a rubber protective end portion. The protective end portion further provides traction to prevent the leg assemblies from accidentally shifting during use.

Yet still another object of the present invention is to include a bumper pad between the leg assembly and the mounting bracket assembly which provides protection of the leg assembly and mounting bracket assembly as well as a noise-dampening function to prevent annoyance due to repeated impact of the leg assembly against the bracket.

Yet still another object of the present invention is to provide a method of utilizing the device that provides a unique means of obtaining one (1) or more instances of the device, installing each mounting bracket assembly on an oven door, opening the oven door and adjusting the foot portion of each leg assembly to an appropriate height to securely contact the adjacent ground surface after full deployment, and benefiting from automatic increased support of the oven door whenever it is fully open.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 oven door support legs
20 mounting bracket assembly
22 side plate
24 bumper pad
26 adhesive layer
28 top plate
30 rear plate
32 first hinge bracket
35 foot
36 locking nut
38 shaft
40 leg assembly
42 front plate
44 bottom plate
46 hinge pin
48 second hinge bracket
100 oven
110 oven door
120 floor surface
130 load

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pair of oven door support legs (herein described as the "apparatus") 10, intended to support a door portion 110 of an existing oven 100 when said door 110 is in a horizontal and open state. When the oven door 110 is opened in a normal manner, a pair of leg assemblies 40 each automatically pivot downward via a gravitational force and subsequently contact a subjacent floor surface 120. Said leg assemblies 40 are stowed in a parallel position along a front surface of said oven door 110 when closed. The apparatus 10 forms a stable support means for said open door 110, thereby allowing a load 130 to be placed upon the oven door 110 as said load 130 enters and exits a cavity portion of the oven 100 in a safe and supported manner. The leg assemblies 40 are discretely concealed within a box-shaped mounting bracket assembly 20 which is fastened to the front surface of the oven door 110, thereby providing an aesthetic appearance. The leg assemblies 40 comprise freely pivoting hinge pin portions 46 which allow said leg assemblies 40 to automatically pivot downward as the oven door 110 is opened, and fold back up against the door surface 110 when the door 110 is closed. Each leg assembly 40 also comprises a height adjustable foot portion 35 to accommodate dimensions of different ovens 100 and floor distance variation.

Figure 1:
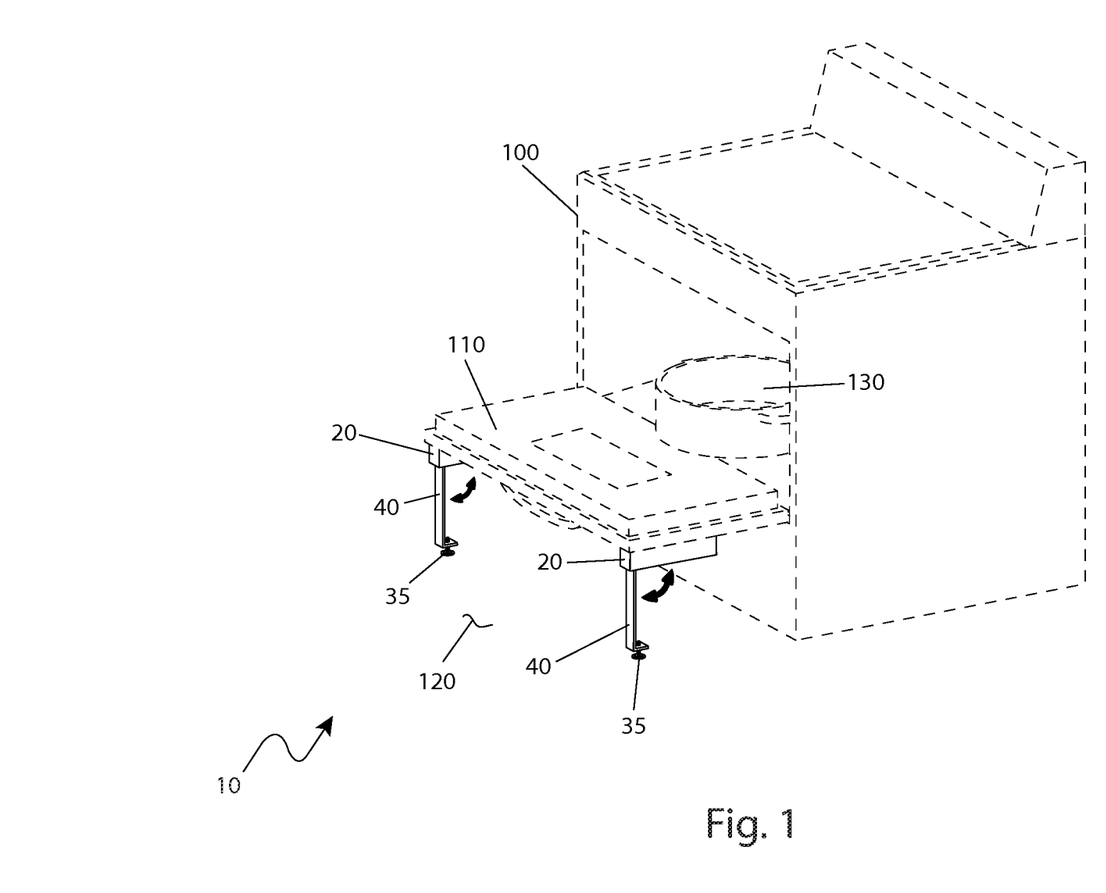
FIG. 1 is an environmental view of oven door support legs 10 mounted upon an oven door 110 depicting a deployed state, according to a preferred embodiment of the present invention.
Figure 2:
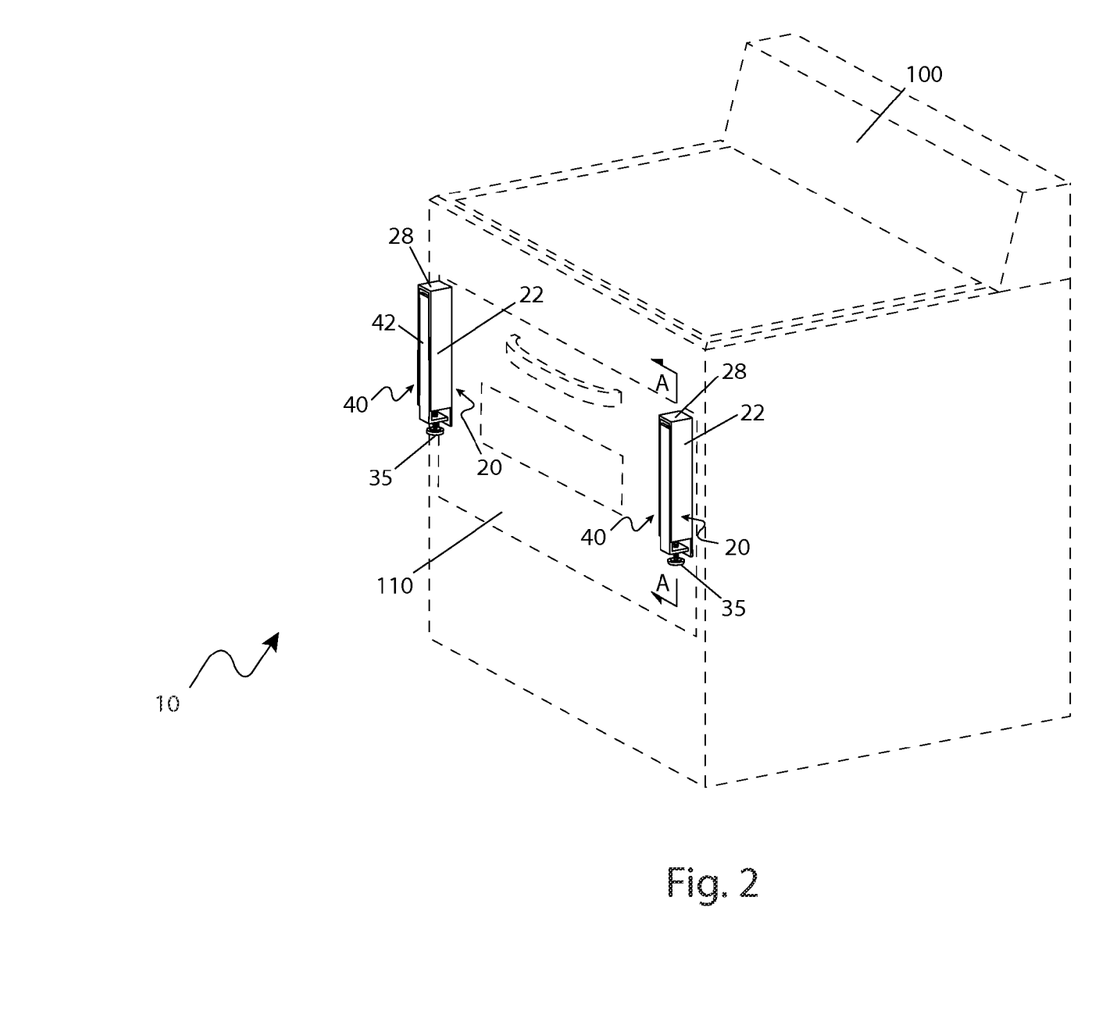
FIG. 2 is an environmental view of oven door support legs 10 mounted upon an oven door 110 depicting a stowed state, according to a preferred embodiment of the present invention.

Referring now to FIGS. 1 and 2, environmental views of the apparatus 10 depicting deployed and stowed states, according to a preferred embodiment of the present invention, are disclosed. The apparatus 10 comprises a pair of mounting bracket assemblies 20 and a pair of pivotally attached leg assemblies 40, thereby supporting the oven door 110 and providing a load bearing means. The mounting bracket assembly 20 comprises a four (4) sided metal rectangular structure adhesively affixed to the oven door 110 which provides a decorative containment of the leg assembly 40 when the oven door 110 is in the closed vertical position (see FIGS. 3a, 3b, and 4).

Figure 4:
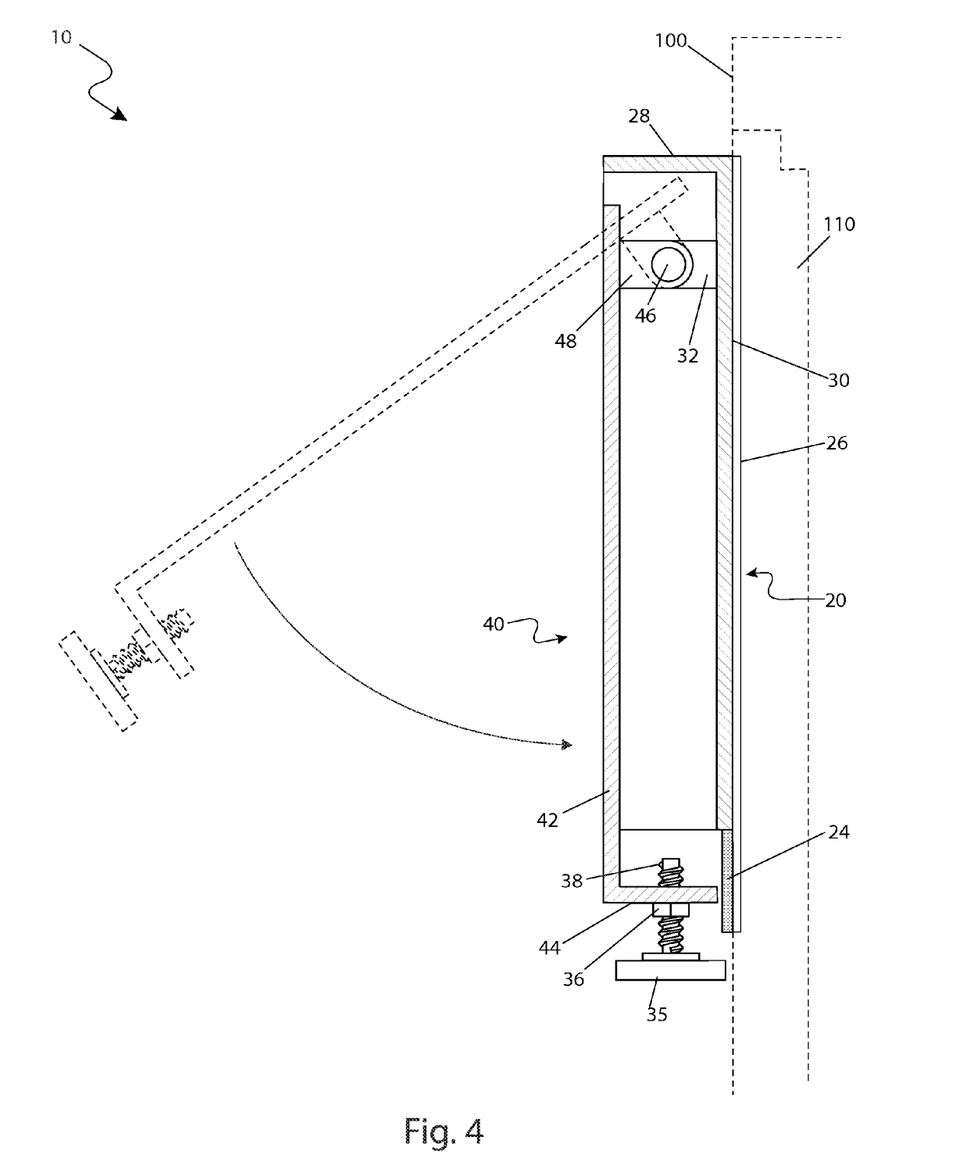

Each leg assembly 40 is approximately twelve (12) inches in height and is attached at a top end portion to a stationary mounting bracket assembly 20 via a single-axis hinge 46 (see FIG. 4). Each leg assembly 40 further comprises a front plate 42, a bottom plate 44, and a height adjustable foot portion 35 which is located at a bottom end portion of said leg assembly 40. The foot portions 35 comprise commercially-available threaded stud units having a flange or conical-shaped rubber protective end portion providing protection against scratching or indentation to a floor surface 120 during use. Each foot 35 comprises a shaft portion 38 threadingly affixed to a respective bottom plate 44 and secured at a user selected length by a locking nut 36 once adjusted properly. The front plate 42 and bottom plate form a unitary "L"-shaped structure. Said bottom plate 44 provides threaded attachment to the shaft portion 38 of the foot 35, thereby allowing a user to adjust an overall length of said leg assembly 40, resulting in the oven door 110 being horizontally orientated and solidly supported when said foot 35 contacts the floor surface 130.

Upon lowering the oven door 110 to a horizontal position, the apparatus 10 establishes vertical mechanical communication between extended outer corner portions of the oven door 110 and the floor surface 120, thereby being capable of supporting an applied load 130 such as pots and pans containing various heavy food stuffs in a stable manner. When the oven door 110 is closed to a vertical orientation, the leg assembly 40 is aesthetically concealed within the mounting bracket assembly 20, thereby working in conjunction to form an aesthetic enclosed appearance.

The mounting bracket 20 and leg 40 assemblies are envisioned to be made preferably using stainless, plated, or painted steel; however, other materials such as high-temperature plastic resins may also be used with equal benefit being capable of withstanding elevated temperatures associated with an oven door 110, and as such should not be interpreted as a limiting factor of the apparatus 10.

The preferred embodiment of the apparatus 10 is that of a retrofit kit providing adhesive attachment to an existing oven 100; however, it is understood that the apparatus 10 may also be introduced as an original equipment feature on new oven models 100 providing equal benefit to a user and as such should not be interpreted as a limiting factor of the apparatus 10.

Figure 3A:
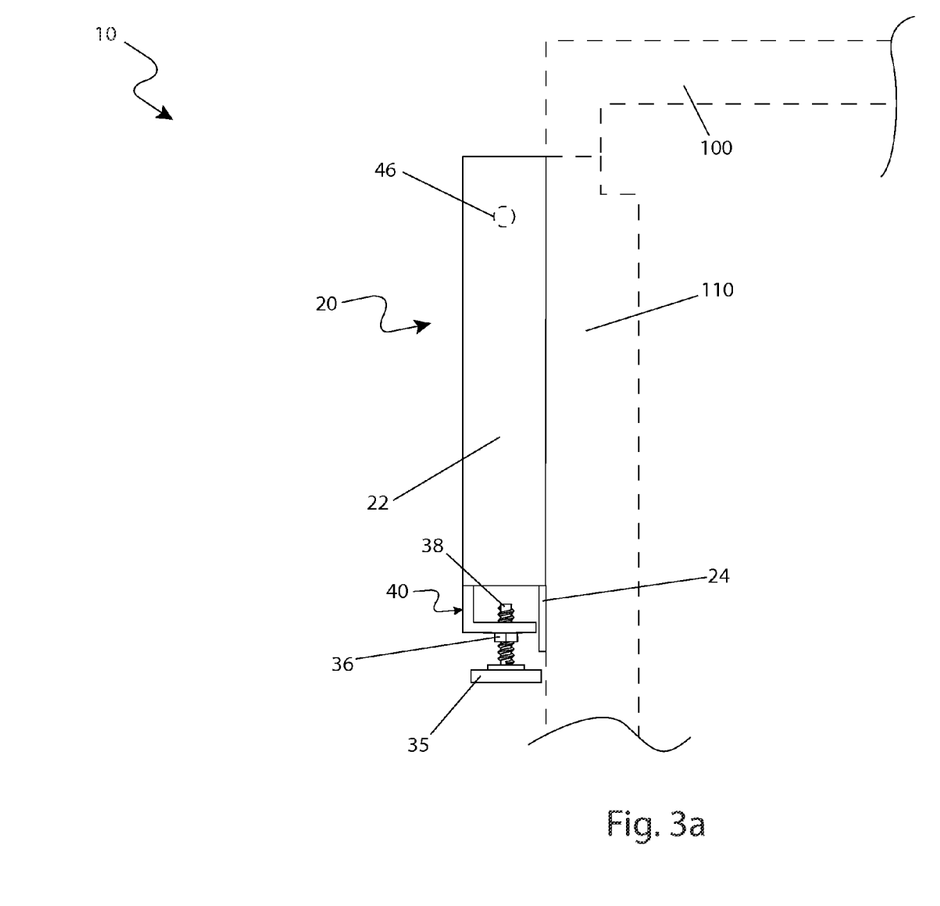
FIG. 3a is a side view of the oven door support legs 10 in a stowed state, according to a preferred embodiment of the present invention.
Figure 3B:
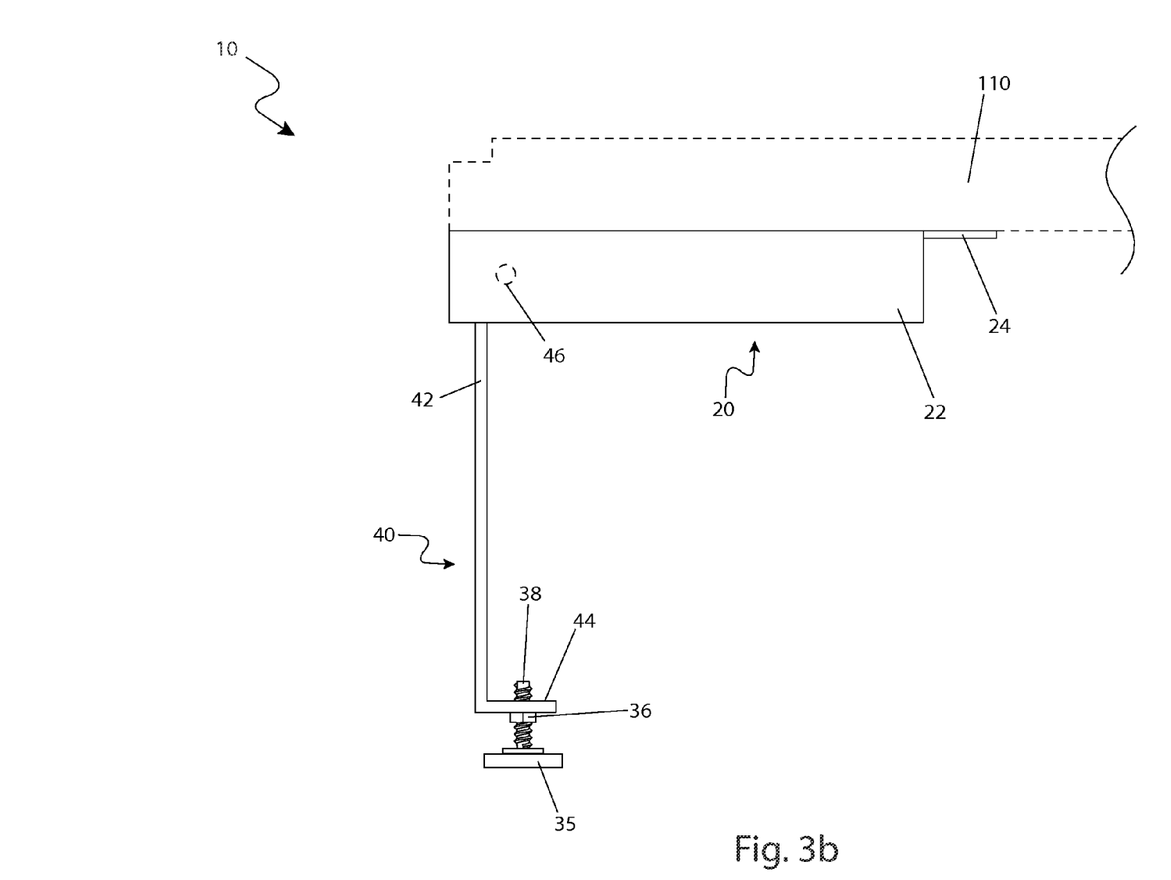
FIG. 3b is a side view of the oven door support legs 10 in a utilized state, according to a preferred embodiment of the present invention; and, FIG. 4 is a section view of the oven door support legs 10 taken along section line A-A (see FIG. 2), according to a preferred embodiment of the present invention.

Referring now to FIGS. 3a, 3b, and 4, side and section views of the apparatus 10 in stowed and utilized states, according to a preferred embodiment of the present invention, are disclosed. Each mounting bracket assembly 20 provides a means to fasten the apparatus 10 to an existing oven door 110 as well as providing an aesthetic stowing containment of the leg assembly 40 during times when said oven door 110 is in a vertical closed position. The mounting bracket assembly 20 further comprises a four-sided metal rectangular enclosure comprising a pair of side plates 22, a top plate 28, and a rear plate 30. The mounting bracket assembly 20 is envisioned to be fabricated using common processes such as welding, forming, or machining. Each mounting bracket assembly 20 comprises open front and bottom portions, thereby aesthetically receiving and containing the leg assembly 40 within. The mounting bracket assembly 20 further provides rotating attachment of said leg assembly 40 via a connecting hinge pin 46 being intermediately positioned between respective rear plate 30 and front plate 42 portions and connected to said rear 30 and front 42 plates via respective perpendicularly protruding first hinge bracket 32 and second hinge bracket 48 portions. Said hinge brackets 32, 48 converge at an upward portion of said rear 30 and front 42 plates to form an axial three-element hinge mechanism. The offset design of the hinge pin 46 with respect to said rear 30 and front 42 plates enables the front plate portion 42 to rotate approximately ninety degrees (90°) before contacting the rear plate portion 30, thereby providing a mechanical limitation to said rotation which results in the leg assembly 40 contacting the floor surface 120 in a perpendicular manner as the oven door 110 is opened as illustrated in FIG. 3b. Said hinge pin 46 is orientated so as to pivot the leg assembly 40 away from a front surface of the oven door 110 automatically due to a gravitational force when said oven door 110 is opened. Upon opening the oven door 110 to a horizontal position, the apparatus 10 supports said oven door 110 and an applied load 130, in a stable manner. When the oven door 110 is closed to a vertical orientation, the mounting bracket assembly 20 and leg assembly 40 work in conjunction to form an aesthetic enclosure of the apparatus 10 (see FIGS. 1 and 2).

The mounting bracket assembly 20 provides an attachment means to the oven door 110 via an adhesive layer 26 further comprising a rectangular-shaped section of high-temperature silicone adhesive applied to a surface of the oven door 110 being aligned with side and top edges of the rear plate 30. Said adhesive layer 26 is envisioned to be provided in a double-faced tape format or other user-friendly means of application. Said adhesive layer 26 extends downwardly below a bottom edge of said rear plate 30 approximately two (2) inches to provide an additional adhesive attachment means to a thin rubber bumper pad 24 having a matching area as the exposed adhesive layer portion 26. The bumper pad 24 provides a noise-dampening means while also providing protection of the oven door 110 from damage as the foot portion 35 makes contact with said bumper pad 24 as the oven door 110 is motioned to a vertical and closed position and the leg assembly 40 coincidentally engages the mounting bracket assembly 20.

The mounting bracket assemblies 20 and leg assemblies 40 are envisioned to be made preferably using stainless, plated, or painted steel; however, other materials such as temperature resistant plastic resins capable of withstanding elevated temperatures associated with an oven door 110 may also be used with equal benefit, and as such should not be interpreted as a limiting factor of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 1 and 2.

The method of installing the apparatus 10 may be achieved by performing the following steps: motioning the oven door 110 to a closed position; marking an anticipated location for the apparatus 10 at the two (2) opposing upper corner portions of the oven door 110 using provided templates and/or dimensions to assure alignment and proper distance from the floor surface 120; installing the first of two (2) portions of the apparatus 10 by applying a rectangular portion of the double-faced high-temperature adhesive layer 26 to the surface of the oven door 110 at the previously marked location by removing a wax paper backing material from said adhesive layer 26; aligning the rear plate 30 with top and side edge portions of the pre-applied adhesive layer 26; pressing said rear plate portion 30 against said adhesive layer 26 until the unit of the apparatus 10 is securely attached to the oven door 110; pressing the bumper 24 against the remaining portion of the adhesive layer 26 until securely affixed; and, repeating the above process for the remaining second unit of the apparatus 10.

The method of utilizing the apparatus 10 may be achieved by performing the following steps: adjusting the foot portions 35 by opening the oven door 110 to a horizontal open position; allowing the leg assemblies 40 to pivot outwardly and downwardly from the oven door 110; loosening the locking nuts 28 using a common hand tool; threadingly engaging shaft portions 38 of each foot portion 35 with respective bottom plate portions 44 inwardly or outwardly until said foot 35 makes contact with the floor surface 120; tightening the locknuts 28; and, benefiting from improved safety and load bearing capability upon an oven door 110 while utilizing the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An oven door support system, comprising a pair of oven door support assemblies each adapted to be fastened to an outer surface of an oven door;

wherein each of said pair of oven door support assemblies
        further comprises:

a four-sided rectangular mounting bracket adaptable to be mounted to said outer surface of said oven door, comprising an upper portion and a lower portion, a planar rear plate having a rear surface adapted to be fastened to said outer surface of said oven door with a high-temperature silicone adhesive, a pair of side plates, and a top plate;

an L-shaped leg assembly freely pivoting relative to said mounting bracket and having an upper portion and a lower portion, a front plate, a bottom plate, and a foot portion located at a bottom edge of said lower portion of said leg assembly having a protective rubber end portion; and, a hinge assembly pivotally connecting said upper portion of said leg assembly to said upper portion of said mounting bracket, further comprising:
  a first hinge bracket perpendicularly extending outward from an inner surface of said rear plate at said upper portion of said mounting bracket;
  a second hinge bracket perpendicularly extending inward from an inner surface of said front plate adjacent to said upper portion of said leg assembly, vertically aligned with said first hinge bracket; and,
  a hinge pin interconnecting said first hinge bracket with said second hinge bracket, thereby providing free pivoting of said leg assembly relative to said mounting bracket;
  wherein said hinge assembly is offset from an upper edge of said leg assembly and said mounting bracket;
  wherein said upper edge of said leg assembly provides a stop to travel of said leg assembly past a ninety degree angle relative to said mounting bracket;

wherein said front plate of said leg assembly has an outer surface coextensive with a front edge of said top plate and front edges of said pair of side plates of said mounting bracket when said oven door is in a closed configuration;

wherein said pair of oven door support assemblies are automatically deployed upon opening said oven door;

wherein said foot portion contacts said ground surface when said oven door is in said open configuration;

wherein said system supports said oven door in an open configuration and a load placed thereupon; and, wherein said pair of oven door support assemblies are fastened to locations on said oven door to evenly distribute a weight of said oven door.

2. The system of claim 1, wherein said foot portion comprises a height adjustment means and a height securing means for securing a desired height of said foot portion.

3. The system of claim 2, wherein said hinge assembly further comprises:
  a first hinge bracket perpendicularly extending outward from an inner surface of said rear plate at said upper portion of said mounting bracket;
  a second hinge bracket perpendicularly extending inward from an inner surface of said front plate adjacent at said upper portion of said leg assembly, vertically aligned with said first hinge bracket; and,
  a hinge pin interconnecting said first hinge bracket with said second hinge bracket, thereby providing free pivoting movement of said leg assembly relative to said mounting bracket;
  wherein said hinge assembly is offset from an upper edge of said leg assembly and said mounting bracket;
  wherein said upper edge of said leg assembly provides a stop to travel of said leg assembly past a ninety degree angle relative to said mounting bracket.

4. The system of claim 3, further comprising a bumper pad affixed to said oven door subjacent to said bottom portion of said mounting assembly;
  wherein said bumper pad protects said oven door from said foot portion striking said oven door when said oven door is being closed; and,
  wherein said bumper pad provides a noise dampening property from said foot portion striking said oven door when being closed.

5. The system of claim 1, further comprising a bumper pad affixed to said oven door subjacent to said bottom portion of said mounting assembly;
  wherein said bumper pad protects said oven door from said foot portion striking said oven door when said oven door is being closed; and,
  wherein said bumper pad provides a noise dampening property from said foot portion striking said oven door when being closed.

6. An oven door support system, comprising:
an oven door adaptable to be attached to an oven; and,
a pair of oven door support assemblies each adapted to be fastened to an outer surface of said oven door, each comprising:
  a four-sided rectangular mounting bracket adaptable to be mounted to said outer surface of said oven door, comprising an upper portion and a lower portion, a planar rear plate having a rear surface adapted to be fastened to said outer surface of said oven door with a-temperature silicone adhesive, a pair of side plates, and a top plate;
  an L-shaped leg assembly freely pivoting relative to said mounting bracket and having an upper portion and a lower portion, a front plate, a bottom plate, and a foot portion located at a bottom edge of said lower portion of said leg assembly having a protective rubber end portion; and,
  a hinge assembly pivotally connecting said upper portion of said leg assembly to said upper portion of said mounting bracket, further comprising:
    a first hinge bracket perpendicularly extending outward from an inner surface of said rear plate at said upper portion of said mounting bracket;
    a second hinge bracket perpendicularly extending inward from an inner surface of said front plate adjacent at said upper portion of said leg assembly, vertically aligned with said first hinge bracket; and,
    a hinge pin interconnecting said first hinge bracket with said second hinge bracket, thereby providing free pivoting movement of said leg assembly relative to said mounting bracket;
    wherein said hinge assembly is offset from an upper edge of said leg assembly and said mounting bracket;
    wherein said upper edge of said leg assembly provides a stop to travel of said leg assembly past a ninety degree angle relative to said mounting bracket;
  wherein said front plate of said leg assembly has an outer surface coextensive with a front edge of said top plate and front edges of said pair of side plates of said mounting bracket when said oven door is in a closed configuration;
  wherein said pair of oven door support assemblies are automatically deployed upon opening said oven door;
  wherein said foot portion contacts said ground surface when said oven door is in said open configuration;

wherein said system supports said oven door in an open configuration and a load placed thereupon; and, wherein said pair of oven door support assemblies are fastened to locations on said oven door to evenly distribute a weight of said oven door.

7. The system of claim 6, wherein said foot portion comprises a height adjustment means and a height securing means for securing a desired height of said foot portion.

8. The system of claim 7, wherein said hinge assembly further comprises:
- a first hinge bracket perpendicularly extending outward from an inner surface of said rear plate at said upper portion of said mounting bracket;
- a second hinge bracket perpendicularly extending inward from an inner surface of said front plate adjacent at said upper portion of said leg assembly, vertically aligned with said first hinge bracket; and,
- a hinge pin interconnecting said first hinge bracket with said second hinge bracket, thereby providing free pivoting movement of said leg assembly relative to said mounting bracket;
- wherein said hinge assembly is offset from an upper edge of said leg assembly and said mounting bracket;
- wherein said upper edge of said leg assembly provides a stop to travel of said leg assembly past a ninety degree angle relative to said mounting bracket.

9. The system of claim 8, further comprising a bumper pad affixed to said oven door subjacent to said bottom portion of said mounting assembly;
- wherein said bumper pad protects said oven door from said foot portion striking said oven door when said oven door is being closed; and,
- wherein said bumper pad provides a noise dampening property from said foot portion striking said oven door when being closed.

10. The system of claim 6, further comprising a bumper pad affixed to said oven door subjacent to said bottom portion of said mounting assembly;
- wherein said bumper pad protects said oven door from said foot portion striking said oven door when said oven door is being closed; and,
- wherein said bumper pad provides a noise dampening property from said foot portion striking said oven door when being closed.

\* \* \* \* \*